US012746546B2

(12) United States Patent
Peng et al.

(10) Patent No.: US 12,746,546 B2
(45) Date of Patent: Sep. 29, 2026

(54) MICRO-FLUIDIC CHIP AND REACTION SYSTEM

(71) Applicant: BOE TECHNOLOGY GROUP CO., LTD., Beijing (CN)

(72) Inventors: Ji Peng, Beijing (CN); Ding Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 726 days.

(21) Appl. No.: 18/027,097

(22) PCT Filed: Apr. 27, 2022

(86) PCT No.: PCT/CN2022/089461

§ 371 (c)(1),
(2) Date: Mar. 18, 2023

(87) PCT Pub. No.: WO2023/206116

PCT Pub. Date: Nov. 2, 2023

(65) Prior Publication Data

US 2024/0299934 A1 Sep. 12, 2024

(51) Int. Cl.
*B01L 3/00* (2006.01)

(52) U.S. Cl.
CPC ..... *B01L 3/502715* (2013.01); *B01L 2300/04* (2013.01); *B01L 2300/0645* (2013.01); *B01L 2300/161* (2013.01); *B01L 2300/1805* (2013.01)

(58) Field of Classification Search
CPC ........... B01L 3/502715; B01L 2300/04; B01L 2300/0645; B01L 2300/161;
(Continued)

(56) References Cited

U.S. PATENT DOCUMENTS

2008/0160601 A1 7/2008 Handique
2011/0126612 A1* 6/2011 Shimizu ................ G01N 27/12 73/31.05

(Continued)

FOREIGN PATENT DOCUMENTS

CN 1301810 A 7/2001
CN 101145060 A 3/2008

(Continued)

OTHER PUBLICATIONS

China Patent Office, First Office Action dated May 28, 2026, for corresponding CN application No. 202280000920.6.

*Primary Examiner* — Melvin C. Mayes
*Assistant Examiner* — Sophia Y Lyle
(74) *Attorney, Agent, or Firm* — HOUTTEMAN LAW LLC

(57) ABSTRACT

The present disclosure provides a micro-fluidic chip and a reaction system. The micro-fluidic chip includes: a base substrate; a micro-cavity defining layer on the base substrate and defining a plurality of micro-reaction chambers; a cover plate on a side of the micro-cavity defining layer away from the base substrate; a heating layer disposed between the micro-cavity defining layer and one of the base substrate and the cover plate, and configured to heat the plurality of micro-reaction chambers. One of the base substrate and the cover plate, which is away from the heating layer, has a first surface and a second surface, the first surface faces the heating layer, the second surface faces away from the heating layer, and a area of the second surface is larger than that of the first surface.

19 Claims, 7 Drawing Sheets

(58) Field of Classification Search
CPC ...... B01L 2300/1805; B01L 7/52; B01L 7/00; B01L 2300/0877; B01L 3/5088; B01L 2300/0893; B01L 3/50851; B01L 2300/1811; B01L 2300/1827; C12M 1/00; C12M 1/38; G01N 21/05; G01N 21/6454; G01N 21/0332; G01N 21/6452
See application file for complete search history.

(56) References Cited

U.S. PATENT DOCUMENTS

| | | | | |
|---|---|---|---|---|
| 2019/0154619 | A1 | 5/2019 | Connolly | |
| 2020/0206734 | A1* | 7/2020 | Ely | B01L 3/502715 |
| 2020/0275528 | A1 | 8/2020 | Muneishi | |
| 2021/0237052 | A1* | 8/2021 | Wu | G01N 21/0332 |
| 2022/0410149 | A1* | 12/2022 | Deng | B01L 3/502707 |

FOREIGN PATENT DOCUMENTS

| | | | | |
|---|---|---|---|---|
| CN | 102220226 | A | 10/2011 | |
| CN | 204325497 | U | 5/2015 | |
| CN | 105073974 | A | 11/2015 | |
| CN | 106929408 | A | 7/2017 | |
| CN | 109414663 | A | 3/2019 | |
| CN | 109536366 | A | 3/2019 | |
| CN | 210596085 | U | 5/2020 | |
| CN | 111266139 | A | 6/2020 | |
| CN | 111343834 | A | 6/2020 | |
| CN | 111548927 | A | 8/2020 | |
| CN | 211292929 | U | 8/2020 | |
| CN | 111656546 | A | 9/2020 | |
| CN | 213708328 | U | 7/2021 | |
| CN | 214361269 | U | 10/2021 | |
| CN | 113583800 | A | 11/2021 | |
| CN | 113658927 | A | 11/2021 | |
| CN | 113694976 | A | 11/2021 | |
| CN | 215743522 | U | 2/2022 | |
| JP | 3071019 | U | 6/2000 | |
| KR | 20100128518 | A | 12/2010 | |
| WO | WO-2020147203 | A1 * | 7/2020 | B01L 7/52 |
| WO | WO-2020190035 | A1 * | 9/2020 | B01L 3/50851 |
| WO | WO-2021218450 | A1 * | 11/2021 | B01L 7/52 |

* cited by examiner

MICRO-FLUIDIC CHIP AND REACTION SYSTEM

TECHNICAL FIELD

The present disclosure relates to the field of biological detection, in particular to a micro-fluidic chip and a reaction system.

BACKGROUND

Polymerase Chain Reaction (PCR) is a molecular biology technique for amplifying and copying specific segments of deoxyribonucleic acid (DNA), and can make many copies of tiny amounts of DNA to greatly increase the amount of DNA. Different from the traditional PCR technique, a digital PCR (dPCR) chip technique is a technique of sufficiently diluting a sample of nucleic acid such that the number of target molecules (that is, DNA templates) in each reaction unit is less than or equal to 1, respectively performing PCR amplification on the target molecules in each reaction unit, and performing statistical analysis on fluorescence signals of each reaction unit after the amplification is finished, thereby achieving absolute quantitative detection of unimolecular DNA. Because the dPCR has the advantages of high sensitivity, strong specificity, higher detection flux, accurate quantification and the like, the dPCR is widely applied to the fields of clinical diagnosis, gene instability analysis, single cell gene expression, environmental microorganism detection, prenatal diagnosis and the like.

SUMMARY

The present disclosure provides a micro-fluidic chip and a reaction system.

In a first aspect, the present disclosure provides a micro-fluidic chip, including:

- a base substrate;
- a micro-cavity defining layer on the base substrate and defining a plurality of micro-reaction chambers;
- a cover plate on a side of the micro-cavity defining layer away from the base substrate; and
- a heating layer between the micro-cavity defining layer and one of the base substrate and the cover plate and configured to heat the plurality of micro-reaction chambers;
- one of the base substrate and the cover plate away from the heating layer serves as a heat dissipation plate and have a first surface facing the heating layer and a second surface away from the heating layer, and an area of the second surface is larger than an area of an orthographic projection of the heating plate on a plane in which the heating layer is located.

In some embodiments, the second surface is provided with a plurality of grooves, and an orthogonal projection of the plurality of micro-reaction chambers on the base substrate overlaps an orthogonal projection of at least two of the plurality of grooves on the base substrate.

In some embodiments, each of the plurality of grooves extends along a first direction, and the plurality of grooves are arranged at intervals along a second direction.

In some embodiments, a dimension of the groove in the second direction is between 0.2 mm and 0.4 mm, a depth of the groove is between 0.1 mm to 0.3 mm, and an interval between every two adjacent grooves is between 0.8 mm and 1.2 mm.

In some embodiments, the plurality of grooves includes a plurality of first grooves and a plurality of second grooves, an orthographic projection of the plurality of first grooves on the micro-cavity defining layer is in a middle region of the micro-cavity defining layer, the second grooves surround a region where the first grooves are located, and a distribution density of the first grooves is larger than that of the second grooves.

In some embodiments, each of the first grooves extends along a first direction, the first grooves are arranged at intervals along a second direction, and the first direction intersects the second direction;

each of the plurality of second grooves extends along a third direction, each side of the region where the plurality of first grooves are located is provided with ones of the plurality of second grooves, the second grooves located on a same side of the region where the plurality of first grooves are located are arranged at intervals along a fourth direction, and the third direction intersects the fourth direction In some embodiments, a dimension of the first groove in the second direction is substantially equal to a dimension of the second groove in the fourth direction, a depth of the first groove is approximately equal to that of the second groove, and an interval between adjacent ones of the plurality of first grooves is smaller than an interval between adjacent ones of the plurality of second grooves.

In some embodiments, the interval between adjacent first grooves is 0.4 to 0.9 times the interval between adjacent second grooves.

In some embodiments, the dimension of the first groove in the second direction and the dimension of the second groove in the fourth direction are both between 0.2 mm and 0.4 mm, the depth of the first groove and the depth of the second groove are both between 0.1 mm and 0.3 mm, the interval between the adjacent first grooves is between 0.4 mm and 0.6 mm, and the interval between the adjacent second grooves is between 0.8 mm and 1.2 mm.

In some embodiments, the heating layer includes a plurality of heating electrodes connected in series, and an orthographic projection of the plurality of micro-reaction chambers on the base substrate overlaps an orthographic projection of at least two of the heating electrodes on the base substrate.

In some embodiments, each of the plurality of heating electrodes extends along a fifth direction, the plurality of heating electrodes are arranged at intervals in a sixth direction, and the fifth direction intersects the sixth direction.

In some embodiments, dimensions of the heating electrodes in the sixth direction are substantially equal, and an interval between every two adjacent heating electrodes is substantially equal.

In some embodiments, the interval between every two adjacent heating electrodes is between 0.8 mm and 1.2 mm, and the dimension of each heating electrode in the sixth direction is between 0.4 mm and 0.6 mm.

In some embodiments, the plurality of heating electrodes includes a plurality of first heating electrodes and a plurality of second heating electrodes, and the second heating electrodes are disposed on both sides of the plurality of first heating electrodes in the sixth direction;

- the first heating electrodes each includes a first sub-electrode and a second sub-electrode that are connected, the second sub-electrode is on both sides of the first sub-electrodes in the fifth direction, and an orthographic projection of the first sub-electrode on the second surface is in a middle region of the second surface; and a resistance of the first sub-electrode per unit length is smaller than a resistance of the second sub-electrode per unit length.

In some embodiments, an area of a cross section of the first sub-electrode perpendicular to the fifth direction is larger than an area of a cross section of the second sub-electrode perpendicular to the fifth direction.

In some embodiments, a dimension of the first sub-electrode in the sixth direction is larger than a dimension of the second sub-electrode in the sixth direction.

In some embodiments, the dimension of the first sub-electrode in the sixth direction is 1.5 to 3 times the dimension of the second sub-electrode in the sixth direction.

In some embodiments, the dimension of the first sub-electrode in the sixth direction is between 0.8 mm and 1.2 mm, and the dimension of the second sub-electrode in the sixth direction is between 0.4 mm and 0.6 mm.

In some embodiments, an interval between adjacent ones of the first sub-electrodes is between 0.4 mm and 0.6 mm, an interval between adjacent ones of the second sub-electrodes is between 0.8 mm and 1.2 mm, and an interval between adjacent ones of the second heating electrodes is between 0.8 mm and 1.2 mm.

In some embodiments, a dimension of the first sub-electrode in the fifth direction is ¼ to ½ of a dimension of the first heating electrode in the fifth direction.

In some embodiments, an orthographic projection of the plurality of heating electrodes on the second surface surround a middle region of the second surface.

In some embodiments, the heating layer further includes a first driving electrode and a second driving electrode, and the plurality of heating electrodes are connected in series between the first driving electrode and the second driving electrode.

In some embodiments, the heating electrode is made of a transparent material.

In some embodiments, the micro-fluidic chip further includes a bonding layer between the cover plate and the base substrate and enclosing an accommodating cavity with the cover plate and the micro-cavity defining layer, the micro-reaction chambers being in the accommodating cavity.

In some embodiments, the micro-fluidic chip further includes a hydrophilic layer covering at least a side wall and a bottom wall of each of the plurality of micro-reaction chambers.

In some embodiments, the micro-fluidic chip further includes a hydrophobic layer;

the heating layer is on a surface of the base substrate facing the cover plate, and the hydrophobic layer is on a surface of the cover plate facing the base substrate; or the heating layer is on a surface of the cover plate facing the base substrate, and the hydrophobic layer is on a surface of the heating layer facing the micro-cavity defining layer.

In some embodiments, the micro-fluidic chip further includes a sample inlet and a sample outlet, and the sample inlet and the sample outlet both penetrate the cover plate and the hydrophobic layer.

In some embodiments, the base substrate and the cover plate each include a glass substrate.

In some embodiments, the heating layer is on a surface of the cover plate facing the micro-cavity defining layer, and the base substrate and the micro-cavity defining layer are formed as a single piece.

In a second aspect, the present disclosure provides a reaction system including the micro-fluidic chip as mentioned above.

BRIEF DESCRIPTION OF DRAWINGS

The accompanying drawings, which constitute a part of the specification, are provided for further understanding of the present disclosure, and for explaining the present disclosure together with the following specific implementations, but not intended to limit the present disclosure. In the drawings.

DETAIL DESCRIPTION OF EMBODIMENTS

Figure 1:
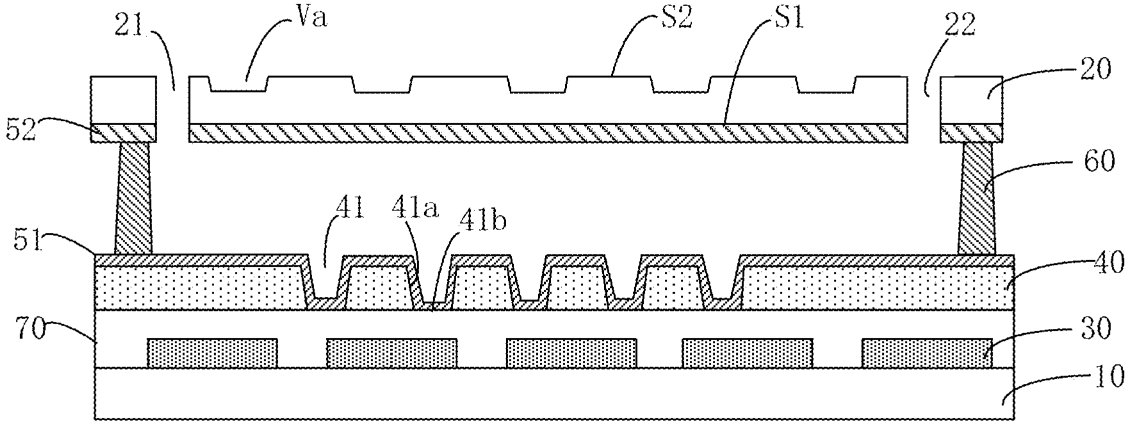
FIG. 1 is a schematic structural diagram of a micro-fluidic chip according to some embodiments of the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only some embodiments but not all embodiments of the present disclosure. All other embodiments derived by those of ordinary skill in the art from the described embodiments of the present disclosure without inventive work should fall within the protection scope of the present disclosure.

Unless defined otherwise, technical or scientific terms used herein shall have the ordinary meaning as understood by those of ordinary skill in the art to which the present disclosure belongs. The use of "first", "second", or the like in the present disclosure is not intended to indicate any order, quantity, or importance, but rather is used to distinguish one element from another. Also, the use of the terms "a", "an", "the" and similar referents does not denote a limitation of quantity, but rather denote the presence of at least one. The word "comprise", "includes" or the like, means that the element or item preceding the word includes the element or item listed after the word and its equivalent, but does not exclude other elements or items. The terms "connected", "coupled" and the like are not restricted to physical or mechanical connections, but may include electrical connections, whether direct or indirect. "Upper", "lower", "left", "right", and the like are used only to indicate relative positional relationships, and when the absolute position of the object being described is changed, the relative positional relationships may be changed accordingly.

When the PCR reaction is conducted, the double-stranded structure of the DNA segment is denatured at high temperature to forms a single-stranded structure, and primer and the single-stranded structure are joined at low temperature according to the base complementary pair principle, and realize base joining and extension at the most suitable temperature for DNA polymerase. The above-mentioned process is called a temperature cycle process of denaturation-annealing-extension. Through multiple temperature cycle processes of denaturation-annealing-extension, mass replication of DNA segments can be achieved.

In order to realize the above temperature cycle process, a series of external devices are usually required to heat the micro-fluidic chip, which result in large size, complex operation and high cost of the devices. In order to improve the integration, temperature control layers, such as a heating layer and a heat dissipation layer, may be integrated in the micro-fluidic chip. In some examples, a micro-fluidic chip includes: a micro-cavity defining layer with a plurality of micro-reaction chambers, a heating layer and a heat dissipation layer, and the heat dissipation layer is on a side of the heating layer away from the micro-cavity defining layer. In this case, when cooling down the sample in the micro-reaction chamber, the heat of the heating layer needs to be taken away firstly and then the sample is cooled down, which reduces the detection efficiency.

Figure 2A:
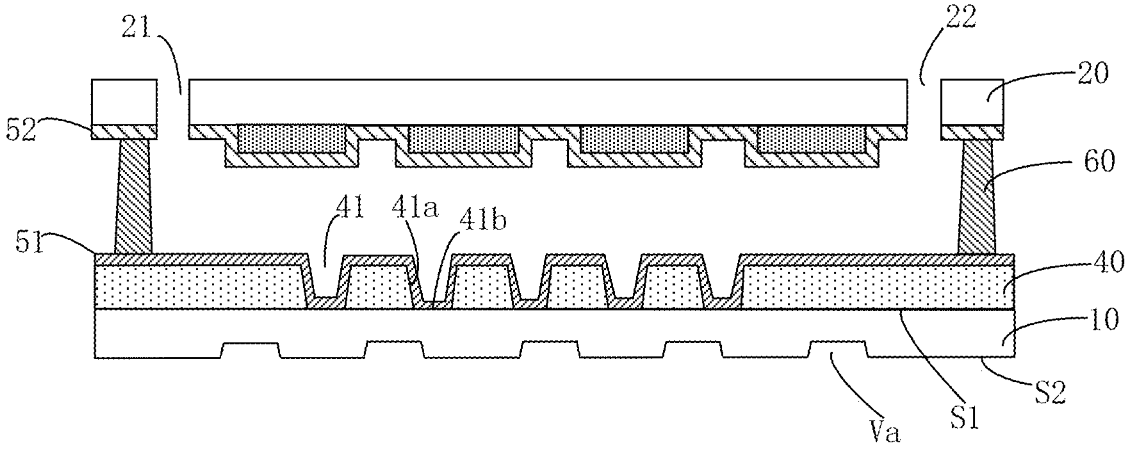
FIG. 2A is a schematic structural diagram of a micro-fluidic chip according to some other embodiments of the present disclosure.
Figure 2B:
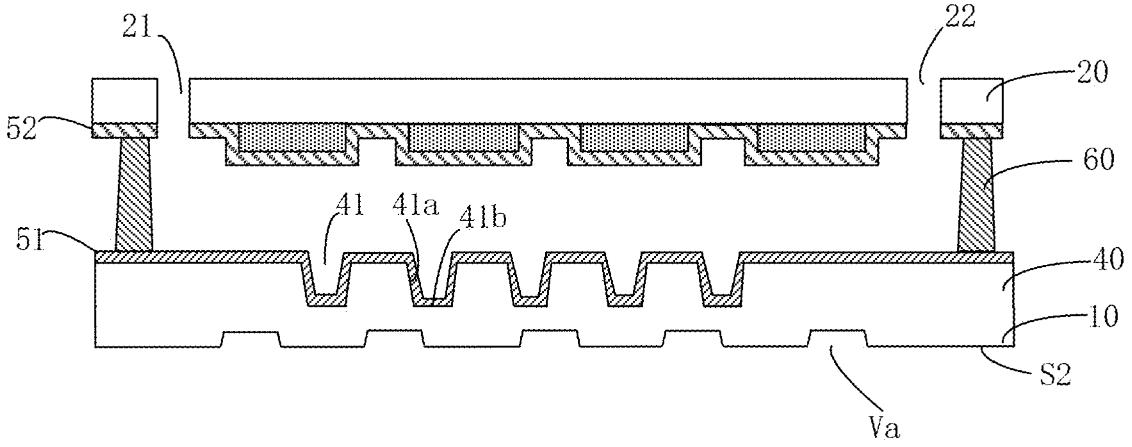
FIG. 2B is a schematic structural diagram of a micro-fluidic chip according to some other embodiments of the present disclosure.

FIG. 1 is a schematic structural diagram of a micro-fluidic chip according to some embodiments of the present disclosure, FIG. 2A is a schematic structural diagram of a micro-fluidic chip according to other embodiments of the present disclosure, and FIG. 2B is a schematic structural diagram of a micro-fluidic chip according to other embodiments of the present disclosure. As shown in FIGS. 1 to 2B, the micro-fluidic chip includes: a base substrate 10, a micro-cavity defining layer 40, a cover plate 20, and a heating layer 30.

The micro-cavity defining layer 40 is disposed on the base substrate 10 and defines a plurality of micro-reaction chambers 41. In some embodiments, the micro-fluidic chip may be configured to perform a polymerase chain reaction (e.g., digital polymerase chain reaction), and may further be configured to perform detection processes after the reaction. The micro-reaction chamber 41 may be configured to accommodate solution for a reaction system (hereinafter, reaction system solution).

The cover plate 20 is disposed opposite to the base substrate 10 and on a side of the micro-cavity defining layer 40 away from the base substrate 10.

The heating layer 30 is disposed between one of the base substrate 10 and the cover plate 20 and the micro-cavity defining layer 40, and configured to heat the plurality of micro-reaction chambers 41, thereby heating the reaction system solution in the micro-reaction chambers 41 to cause an amplification reaction. The heating layer 30 may be made of a conductive material so as to release heat after being electrified.

One of the base substrate 10 and the cover plate 20 away from the heating layer 30 serves as a heat dissipation plate and has a first surface S1 facing the heating layer 30 and a second surface S2 away from the heating layer 30. The second surface S2 serves as a heat dissipation surface having an area larger than an area of an orthographic projection of the heat dissipation plate on a plane where the heating layer 30 is located, thereby improving heat dissipation effect on the solution in the micro-reaction chamber 41 when the cooling fluid is blown to the second surface S2.

For example, as shown in FIG. 1, the heating layer 30 is located between the base substrate 10 and the micro-cavity defining layer 40, and in this case, a lower surface of the cover plate 20 is the first surface S1, an upper surface of the cover plate 20 is the second surface S2, and an area of the upper surface of the cover plate 20 is larger than an area of an orthographic projection of the cover plate 20 on the plane where the heating layer 30 is located. In FIG. 1, the upper surface of the base substrate 10 is the plane where the heating layer 30 is located; in a case where the lower surface of the cover plate 20 is a plane, the area of the orthographic projection of the cover plate 20 on the plane where the heating layer 30 is located is equal to the area of the lower surface of the cover plate 20. For another example, as shown in FIG. 2A, the heating layer 30 is located between the cover plate 20 and the micro-cavity defining layer 40, and in this case of FIG. 2A, the base substrate 10 serves as a heat dissipation plate, an upper surface of the base substrate is the first surface S1, a lower surface of the base substrate 10 is the second surface S2, and an area of the lower surface of the base substrate 10 is larger than an area of an orthographic projection of the base substrate 10 on the plane where the heating layer 30 is located. In FIG. 2A, the plane where the heating layer 30 is located is the lower surface of the cover plate 20; in a case where the upper surface of the base substrate 10 is a plane, the area of the orthographic projection of the base substrate 10 on the plane where the heating layer 30 is located is equal to the area of the upper surface of the base substrate 10. That is, the second surface S2 (heat dissipation surface) has a relatively large area, thereby improving the heat dissipation effect; also, the second surface S2 and the heating layer 30 are respectively located on opposite two sides of the micro-cavity defining layer 40, and in this case, when heat is dissipated through the second surface S2, the heat of the heating layer 30 does not need to be taken away; the heating layer 30, when heating the chambers, is not affected by the temperature of the heat dissipation surface, thereby improving the temperature raising efficiency.

The micro-fluidic chip in the embodiments of the present disclosure will be described below by taking an example in which the heating layer 30 is disposed between the base substrate 10 and the micro-cavity defining layer 40.

Both the base substrate 10 and the cover plate 20 may be glass substrates. It should be noted that the base substrate and the cover plate may also be substrates made of other suitable materials, which is not limited in the embodiments of the present disclosure. The shapes of the base substrate 10 and the cover plate 20 may be rectangular, and may also be other suitable shapes, which are not limited in the embodiments of the present disclosure. The shape and size of the cover plate 20 may be the same as those of the base substrate 10.

As shown in FIG. 1, the micro-cavity defining layer 40 is located on the base substrate 10 and defines a plurality of micro-reaction chambers 41. Adjacent micro-reaction chambers 41 are at least partially spaced apart from each other (e.g., by partition walls). Each micro-reaction chamber 41 includes a side wall 41*a* and a bottom wall 41*b*. The micro-reaction chamber 41 provides a space for accommodating the reaction system solution, and the micro-reaction chamber 41 may be a micro reaction groove, a recess, or the like, as long as there is a space capable of accommodating the reaction system solution, which is not limited in the embodiments of the present disclosure. For example, a depth of the micro-reaction groove or recess may be about 10 μm, or other suitable values.

In some embodiments, shapes of the plurality of micro-reaction chambers 41 may be the same, and a three-dimensional shape of each micro-reaction chamber 41 is, for example, an approximate truncated cone, whose cross section in a direction perpendicular to the base substrate 10 has a shape of approximate trapezoid and whose cross section parallel to the base substrate 10 has a shape of an approximate circle. It should be noted that, at least a part of the micro-reaction chambers 41 may have different shapes.

It should be noted that, in the embodiments of the present disclosure, the shape of the micro-reaction chamber 41 is not limited, and may be designed according to actual requirements. For example, each of the micro-reaction chambers 41 may have any suitable shape such as a cylindrical shape, a rectangular parallelepiped shape, a polygonal prism shape, a spherical shape, or an ellipsoidal shape. For example, a shape of a cross section of the micro-reaction chamber 41 in a plane parallel to the base substrate 10 may be an ellipse, a triangle, a polygon, an irregular shape, etc., and a shape of its cross section in a direction perpendicular to the base substrate 10 may be a square, a circle, a parallelogram, a rectangle, etc.

In some embodiments, a plurality of micro-reaction chambers 41 are uniformly distributed in the micro-cavity defining layer 40. For example, the plurality of micro-reaction chambers 41 are arranged in an array, which can make the fluorescent image obtained in the subsequent stage of optical detection of the micro-fluidic chip more regular and orderly, so as to obtain the detection result quickly and accurately. It should be noted that the embodiments of the present disclosure are not limited thereto, and the plurality of micro-reaction chambers 41 may also be distributed unevenly or in other arrangements, which is not limited in the embodiments of the present disclosure.

In addition, in the embodiment of the present disclosure, the size and number of the micro-reaction chambers 41 may be determined according to actual requirements, and the size and number of the micro-reaction chambers 41 are related to the size of the micro-cavity defining layer 40. In the case where the size of the micro-reaction chambers 41 is fixed, the larger the number of micro-reaction chambers 41, the larger the sizes of the micro-cavity defining layer 40, the base substrate 10, and the cover plate 20, accordingly. For example, in the current manufacturing process, the number of the micro-reaction chambers 41 may reach hundreds of thousands or even millions within an area of tens of square centimeters, and the detection throughput of the micro-fluidic chip is large.

In some embodiments, the material of the micro-cavity defining layer 40 may be a photoresist, and the photoresist may be formed on the base substrate 10 by spin coating. The photoresist is patterned so that the micro-cavity defining layer 40 having a plurality of micro-reaction chambers 41 may be obtained.

In some embodiments, as shown in FIG. 1, the heating layer 30 is disposed on the base substrate 10 between the base substrate 10 and the micro-cavity defining layer 40. The heating layer 30 is configured to release heat after being electrified, thereby heating the reaction system solution in the micro-reaction chamber 41.

Figure 3:
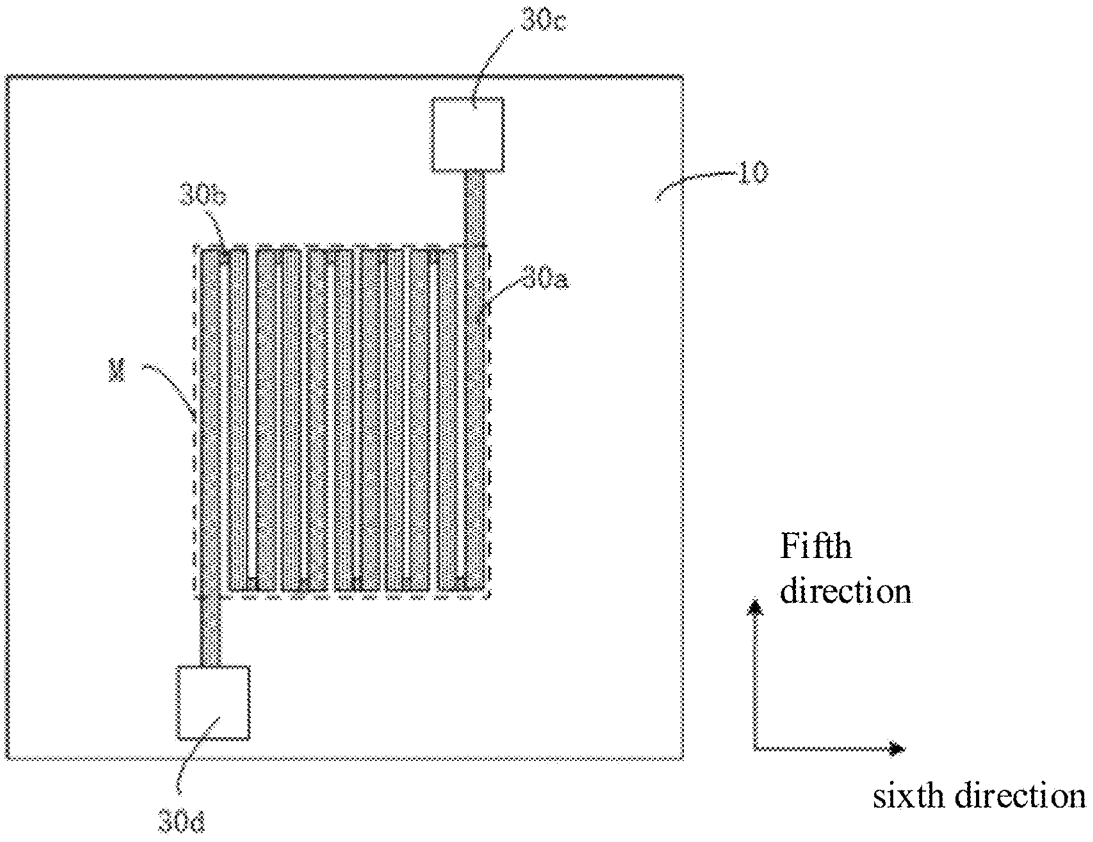
FIG. 3 is a plan view of a heating layer according to some embodiments of the present disclosure.

FIG. 3 is a plan view of a heating layer according to some embodiments of the present disclosure. As shown in FIG. 3, the heating layer 30 may include a first driving electrode 30*c* and a second driving electrode 30*d*, and further include a plurality of heating electrodes 30*a* connected in series between the first driving electrode 30*c* and the second driving electrode 30*d*. An orthographic projection of the plurality of micro-reaction chambers 41 on the base substrate 10 overlaps with an orthographic projection of at least two of the heating electrodes 30*a* on the base substrate 10, so as to facilitate effective heating of the plurality of micro-reaction chambers 41 by the heating layer 30. For example, an orthographic projection of a region where the plurality of micro-reaction chambers 41 are located on the base substrate 10 is located within an orthographic projection of a region where the plurality of heating electrodes 30*a* are located on the base substrate 10, so as to facilitate sufficient heating of the plurality of micro-reaction chambers 41 by the heating layer 30. For example, the orthographic projection of the region where the plurality of heating electrodes 30*a* are located on the base substrate 10 may be the same as the orthographic projection of the region where the plurality of micro-reaction chambers 41 are located on the base substrate 10, or slightly larger than the orthographic projection of the region where the plurality of micro-reaction chambers 41 are located on the base substrate 10.

It should be noted that, the region where the plurality of micro-reaction chambers 41 are located is a continuous region, which may be regarded as a minimum region capable of covering all the micro-reaction chambers 41. Similarly, the region where the plurality of heating electrodes 30*a* are located is also a continuous region, which may be regarded as the minimum region capable of covering all the heating electrodes 30*a*. For example, in FIG. 3, the region where the plurality of heating electrodes 30*a* are located is a region surrounded by a dashed box M.

When the micro-reaction chamber 41 needs to be heated, a driving device provides different voltage signals to the first driving electrode 30*c* and the second driving electrode 30*d* to form a current path between the first driving electrode 30*c* and the second driving electrode 30*d*, so that each heating electrode 30*a* has a current flowing through the same, thereby releasing heat.

Compared with the parallel connection method, when the plurality of heating electrodes 30*a* are connected in series, the current on each heating electrode 30*a* is equal, and the heating efficiency of the heating electrode 30*a* is related to the resistance, so when the heating efficiency of the heating electrode 30*a* to different regions of the micro-cavity defining layer 40 needs to be adjusted, only the resistance needs to be adjusted, and the adjustment method is simpler. In addition, the heating power error of the series circuit is much smaller than the heating power error of the parallel circuit under the same manufacturing error. Table 1 shows data of the heating power for the parallel circuit and the series circuit, and in Table 1, in a case where the plurality of heating electrodes 30*a* are connected in series, when the target resistance of each heating electrode 30*a* is 2002 and the resistance due to actual manufacturing is 2152, the power actually generated by the plurality of heating electrodes 30*a* connected in series is 7.20 W, which has a small difference from the target power (6.85 W); in a case where the plurality of heating electrodes 30*a* are connected in parallel, when the target resistance of each heating electrode 30*a* is 20Ω and the resistance due to actual manufacturing is 21Ω, the power actually generated by the plurality of heating electrodes 30*a* connected in parallel is 27.43 W, which has a large difference from the target power (28.8 W).

TABLE 1

| Voltage: 24 V | | | |
|---|---|---|---|
| | | Power for circuits connected in parallel (W) | Power for circuits connected in series (W) |
| Resistance 1 | 20 Ω | 28.8 | 6.85 |
| Resistance 2 | 21 Ω | 27.43 | 7.20 |
| Difference of power | | 1.37 | 0.35 |

In some embodiments, as shown in FIG. 3, each of the heating electrodes 30*a* has a bar shape, an orthographic projection of which on the first surface S1 extends along a fifth direction, and the plurality of heating electrodes 30*a* are spaced along a sixth direction, and the fifth direction intersects the sixth direction. For example, the fifth direction is perpendicular to the sixth direction.

It should be noted that, the heating electrode 30*a* having a bar shape means that the largest dimension of the heating electrode 30*a* in the fifth direction is larger than the largest dimension of the heating electrode 30*a* in the sixth direction. For example, the heating electrode 30*a* is rectangular; or, the heating electrode 30*a* is wavy, that is, the left and right sides of the heating electrode 30*a* are wavy; or, the heating electrode 30*a* is trapezoidal, that is, the left and right sides of the heating electrode 30*a* are not perpendicular to the lower side of the heating electrode 30*a*; it should be noted that, the heating electrode 30*a* may have other shapes.

As shown in FIG. 3, a plurality of heating electrodes 30*a* are connected to from an electrode string, and at least two heating electrodes 30*a* are connected by a connection portion 30*b*. For example, when the plurality of heating electrodes 30*a* extend in a same extending direction and are arranged in sequence in a direction intersecting the extending direction, every two adjacent heating electrodes 30*a* are connected by the connection portion 30*b*. The material of the connection portion 30*b* may be the same as that of the heating electrode 30*a*, thereby simplifying the manufacturing process.

In some embodiments, as shown in FIG. 3, the resistances of different heating electrodes 30*a* may be the same. For example, an orthographic projection of each heating electrode 30*a* on the first surface S1 is rectangular, the dimensions of different heating electrodes 30*a* in the sixth direction are substantially equal, and an interval between every two adjacent heating electrodes 30*a* is substantially equal.

It should be noted that, the interval between two adjacent heating electrodes 30*a* refers to the closest distance between two adjacent heating electrodes 30*a*, and specifically, may be a distance between edges of the two adjacent heating electrodes that are close to each other. In the embodiments of the present disclosure, a plurality of values being "substantially equal" means that the difference between any two values is less than a certain range, for example, less than 5% or 10%. It should be noted that, "substantially equal" may also mean that these values are exactly equal.

In one example, the interval between every two adjacent heating electrodes 30*a* arranged in a same direction is between 0.8 mm and 1.2 mm, for example, the distance between every two adjacent heating electrodes 30*a* is 0.8 mm, 0.9 mm, 1 mm, 1.1 mm or 1.2 mm. The dimension of each heating electrode 30*a* in the sixth direction is between 0.4 mm and 0.6 mm. For example, each heating electrode 30*a* has a dimension in the sixth direction of 0.4 mm, 0.5 mm or 0.6 mm.

Figure 4:
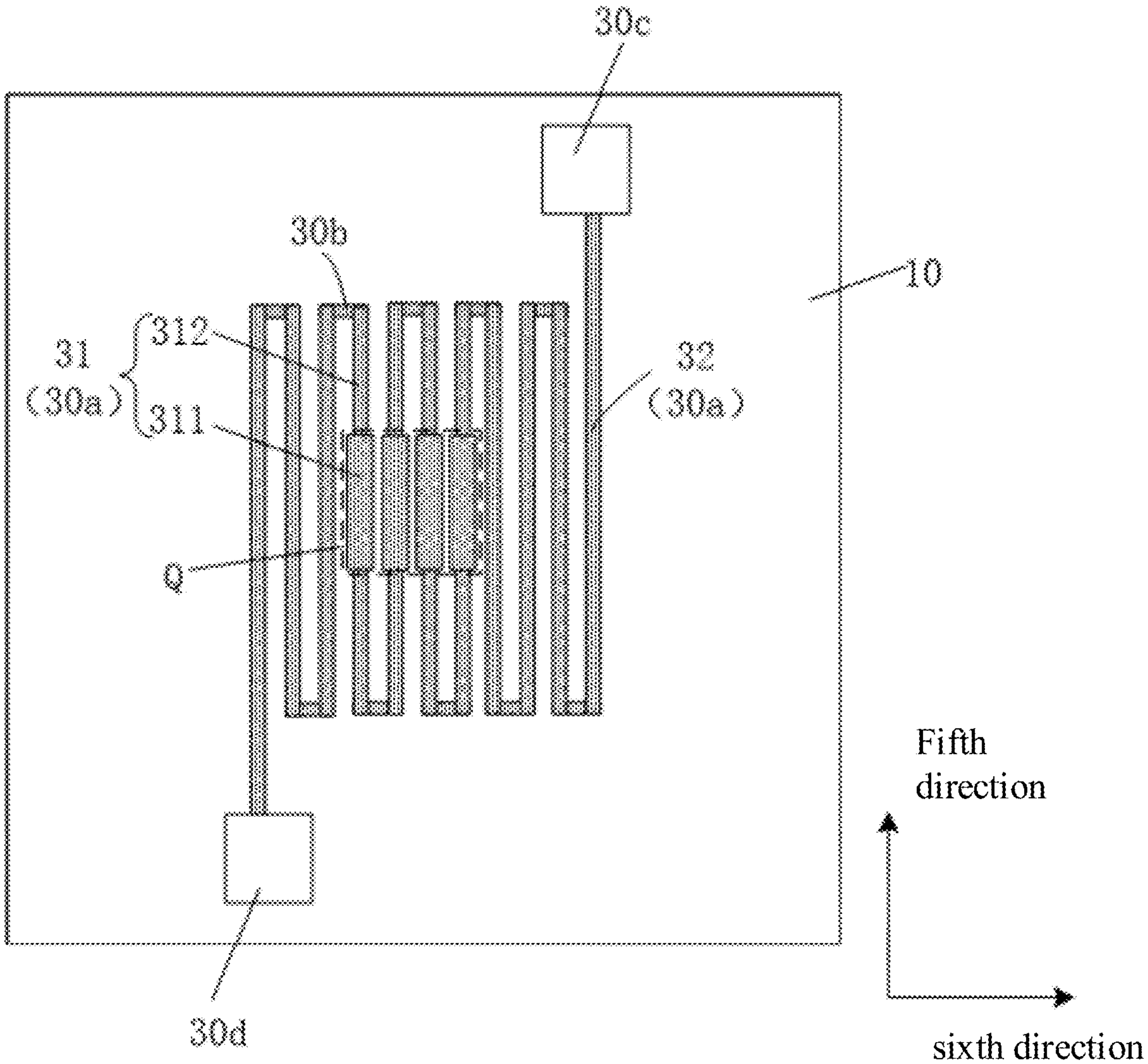
FIG. 4 is a schematic plan view of a heating layer according to some other embodiments of the present disclosure.

FIG. 4 is a plan view of a heating layer according to other embodiments of the present disclosure. The heating layer 30 shown in FIG. 4 is similar to the heating layer 30 shown in FIG. 3, and each includes a first driving electrode 30*c*, a second driving electrode 30*d*, and a plurality of heating electrodes 30*a* connected in series therebetween. Each heating electrode 30*a* has a bar shape, an orthographic projection of which on the first surface S1 extends in the fifth direction, the plurality of heating electrodes 30*a* are arranged at intervals in the sixth direction, and every two adjacent heating electrodes 30*a* may be connected by a connection portion 30*b*. The heating layer 30 shown in FIG. 4 differs from FIG. 3 in that, in FIG. 4, the plurality of heating electrodes 30*a* includes a plurality of first heating electrodes 31 and a plurality of second heating electrodes 32, and the second heating electrodes 32 are disposed on each of both sides of the plurality of first heating electrodes 31 in the sixth direction. For example, multiple second heating electrodes 32 are disposed on each of both sides of the plurality of first heating electrodes 31 in the sixth direction. It should be noted that, in FIG. 4, it is only schematically illustrated that three second heating electrodes 32 are disposed on each of both sides of the plurality of first heating electrodes 31, but this is not limited in the embodiments of the present disclosure, and the number of the second heating electrodes 32 may be set according to actual needs.

When the heat dissipated from each position of the heating layer 30 is the same, the heat concentration would occur in a middle region of the micro-cavity defining layer 40, thereby causing uneven heating of the micro-cavity defining layer 40. In order to improve the heating uniformity of the micro-cavity defining layer 40, the heating effect of the heating layer 30 on the middle region of the micro-cavity defining layer 40 may be reduced, which may be achieved by adjusting the resistance of the first heating electrode 31.

As shown in FIG. 4, the first heating electrode 31 includes a first sub-electrode 311 and a second sub-electrode 312 that are connected to each other, the second sub-electrode 312 is disposed on both sides of the first sub-electrode 311 in the fifth direction, and an orthographic projection of the first sub-electrode 311 on the micro-cavity defining layer 40 is located in the middle region of the micro-cavity defining layer 40. That is, the region Q where the first sub-electrodes 311 of the plurality of first heating electrodes 31 are located corresponds to the middle region of the micro-cavity defining layer 40. The resistance of the first sub-electrode 311 per unit length is smaller than the resistance of the second sub-electrode 312 per unit length. It should be noted that the "middle region" is a region of the micro-cavity defining layer 40 which has a predetermined size and is located in the middle of the micro-cavity defining layer 40, and the size of the region may be determined according to actual situations. For example, when the heat released from each position of the heating layer 30 is the same, a region of the micro-cavity defining layer 40 at which the temperature raises faster serves as the middle region. It should be further noted that, the "unit length" means a unit length in the fifth direction, and may be 1 μm or 1 mm. That is, in the fifth direction, the resistance of the first sub-electrode 311 with a length of 1 μm (or 1 mm) or less than 1 μm (or 1 mm) is smaller than the resistance of the second sub-electrode 312 with a length of 1 μm (or 1 mm) or less than 1 μm (or 1 mm). By this arrangement, the uniformity with which the micro-cavity defining layer 40 is heated is advantageously improved.

In some embodiments, the ratio of the length of the first sub-electrode 311 (i.e., the dimension of the first sub-electrode 311 in the fifth direction) to the length of the first heating electrode 31 (i.e., the dimension of the first heating electrode 31 in the fifth direction) may be determined according to the size of the middle region. In some examples, the length of the first sub-electrode 311 is ¼ to ½ of the length of the first heating electrode 31, and for example, the length of the first sub-electrode 311 is ¼, ⅓ or ½ of the length of the first heating electrode 31. In some embodiments, the length of the first heating electrode 31 and the length of the second heating electrode 32 may be substantially equal.

In some embodiments, the first sub-electrode 311 and the second sub-electrode 312 are made of the same material to facilitate the fabrication process. In this case, an area of the cross section of the first sub-electrode 311 perpendicular to the fifth direction may be set larger than that of the cross section of the second sub-electrode 312 perpendicular to the fifth direction, so that the resistance of the first sub-electrode 311 per unit length is smaller than the resistance of the second sub-electrode 312 per unit length.

In some embodiments, the thicknesses of the first sub-electrode 311 and the second sub-electrode 312 are set to be equal, and the dimension of the first sub-electrode 311 in the sixth direction is set to be larger than that of the second sub-electrode 312 in the sixth direction, so that the first sub-electrode 311 and the second sub-electrode 312 satisfy the above resistance requirement and are convenient for manufacturing.

Exemplarily, orthographic projections of the first sub-electrode 311, the second sub-electrode 312 and the second heating electrode 32 on the first surface S1 are all rectangular. The dimension of the first sub-electrode 311 in the sixth direction is 1.5 to 3 times the dimension of the second sub-electrode 312 in the sixth direction. For example, the dimension of the first sub-electrode 311 in the sixth direction is 1.5 times, 1.8 times, 2 times, 2.5 times, or 3 times the dimension of the second sub-electrode 312 in the sixth direction.

Exemplarily, the dimension of the first sub-electrode 311 in the sixth direction is between 0.8 mm and 1.2 mm. For example, the dimension of the first sub-electrode 311 in the sixth direction is 0.8 mm, 0.9 mm, 1 mm, 1.1 mm or 1.2 mm. The dimension of the second sub-electrode 312 in the sixth direction is between 0.4 mm and 0.6 mm. For example, the dimension of the second sub-electrode 312 in the sixth direction is 0.4 mm, 0.45 mm, 0.5 mm, 0.55 mm or 0.6 mm.

Exemplarily, the interval between adjacent first sub-electrodes 311 is between 0.4 mm and 0.6 mm. For example, the interval between adjacent first sub-electrodes 311 is 0.4 mm, 0.45 mm, 0.5 mm, 0.55 mm or 0.6 mm. Exemplarily, the interval between adjacent second sub-electrodes 312 is between 0.8 mm and 1.2 mm. For example, the interval between adjacent second sub-electrodes 312 is 0.8 mm, 0.9 mm, 1 mm, 1.1 mm or 1.2 mm. Exemplarily, the interval between adjacent second heating electrodes 32 is between 0.8 mm and 1.2 mm. For example, the interval between adjacent second heating electrodes 32 is 0.8 mm, 0.9 mm, 1 mm, 1.1 mm or 1.2 mm.

Figure 5:
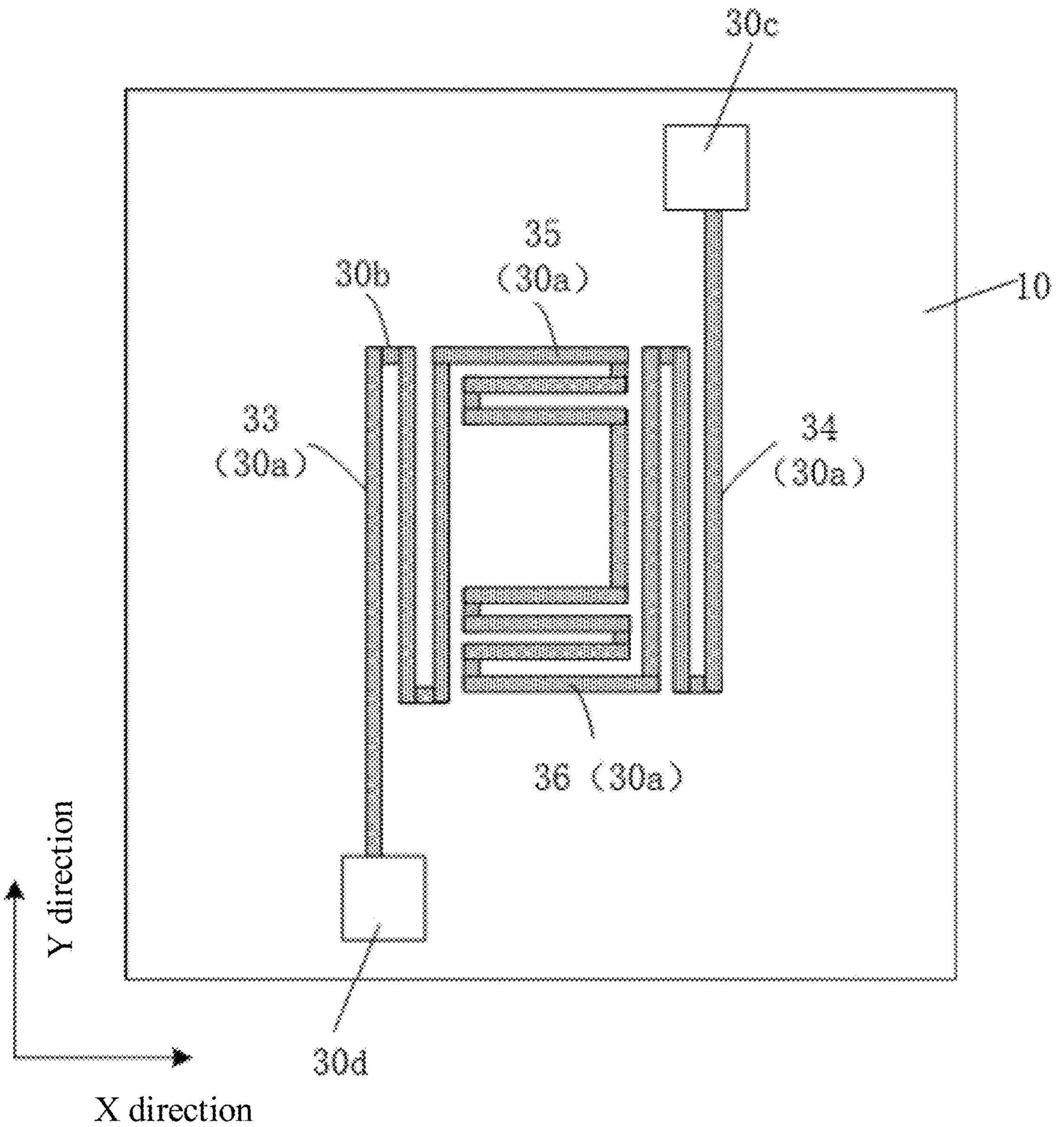
FIG. 5 is a plan view of a heating layer according to some other embodiments of the present disclosure.

FIG. 5 is a plan view of a heating layer according to other embodiments of the present disclosure. The heating layer 30 shown in FIG. 5 is similar to the heating layer 30 shown in FIG. 3, and each includes a first driving electrode 30*c*, a second driving electrode 30*d*, and a plurality of heating electrodes 30*a* connected in series therebetween. Each heating electrode 30*a* may have a bar shape, and the plurality of heating electrodes 30*a* are connected to form an electrode string by connection portions 30*b*. The heating layer 30 shown in FIG. 5 differs from FIG. 3 in that in FIG. 5, the orthographic projection of the plurality of heating electrodes 30*a* on the micro-cavity defining layer 40 surrounds the middle region of the micro-cavity defining layer 40. This arrangement also reduces the heating power in the middle of the heating layer 30, thereby improving the uniformity of heating of the micro-cavity defining layer 40.

For example, as shown in FIG. 5, the plurality of heating electrodes 30*a* includes a plurality of third heating electrodes 33, a plurality of fourth heating electrodes 34, a plurality of fifth heating electrodes 35, and a plurality of sixth heating electrodes 36, and the plurality of third heating electrodes 33 and the plurality of fourth heating electrodes 34 are arranged at intervals in the X direction. The plurality of fifth heating electrodes 35 and the plurality of sixth heating electrodes 36 are arranged at intervals in the Y direction, each fifth heating electrode 35 and each sixth heating electrode 36 extend in the X direction, and each third heating electrode 33 and each fourth heating electrode 34 extend in the Y direction. Orthographic projections of the third heating electrode 30*a*, the fourth heating electrode 30*a*, the fifth heating electrode 30*a* and the sixth heating electrode 30*a* on the micro-cavity defining layer 40 are respectively located on different sides of the middle region.

In the embodiments illustrated in FIGS. 3 to 5, an orthographic projection of each heating electrode 30*a* on the first surface S1 may be rectangular, but the embodiments of the present disclosure are not limited thereto. For example, an orthographic projection of each of some of the heating electrodes 30*a* on the first surface S1 has an arc shape.

In the embodiments of the present disclosure, the heating electrode 30*a* may be made of a conductive material with a relatively high resistivity, so that the heating electrode 30*a* generates relatively much heat when receiving a relatively small electrical signal to improve the energy transformation ratio. For example, the heating electrode 30*a* may be made of a transparent conductive material, such as indium tin oxide (ITO), tin oxide, etc., which not only has a larger resistivity than a metal material but also is transparent, thereby facilitating the subsequent optical detection while realizing the heating. It should be noted that the embodiments of the present disclosure are not limited thereto, and the heating electrode 30*a* may also be made of other suitable materials, such as metal, and the like, and the embodiments of the present disclosure are not limited thereto.

In addition, the first driving electrode 30*c* and the second driving electrode 30*d* may have a shape of large-sized square, so that they may be conveniently in contact and connection with probes or electrodes in the driving device, and have a large contact area, which may stably receive electrical signals. In this way, the micro-fluidic chip may be implemented in a manner of plug and play, resulting in simple operation and convenient use. The first driving electrode 30*c* and the second driving electrode 30*d* may be made of a metal material to improve the electrical conductivity of the two electrodes, which is beneficial for the driving device to provide the heating layer 30 with a driving signal.

In addition, the positions of the first driving electrode 30*c* and the second driving electrode 30*d* relative to the plurality of heating electrodes 30*a* may be set according to actual requirements, which is not limited in the present disclosure. For example, as shown in FIGS. 3 to 5, the first driving electrode 30*c* and the second driving electrode 30*d* may be respectively located on two opposite sides of the plurality of heating electrodes 30*a*, and alternatively, the second driving electrode 30*d* and the second driving electrode 30*d* may be located on the same side of the plurality of heating electrodes 30*a*.

With continued reference to FIG. 1, when the heating layer 30 is located on the base substrate 10, the micro-fluidic chip may further include an insulation layer 70 located between the heating layer 30 and the micro-cavity defining layer 40. The insulation layer 70 serves to protect the heating electrode 30*a*, prevent moisture from corroding the heating electrode 30*a*, slow down the aging of the heating electrode, and may serve a planarization function. For example, the insulation layer 70 may be made of an inorganic insulating material or an organic insulating material. For example, the material of the insulation layer 70 may include silicon oxide, silicon nitride, or the like.

It should be noted that via holes are provided in the insulation layer 70 at positions corresponding to the first driving electrode 30*c* and the second driving electrode 30*d*, so as to expose at least a portion of the first driving electrode 30*c* and at least a portion of the second driving electrode 30*d*, so as to ensure the electrical connection of the first driving electrode 30*c* and the second driving electrode 30*d* with the driving device.

With continued reference to FIG. 1, the micro-fluidic chip further includes a hydrophilic layer 51 covering at least the side wall 41*a* and the bottom wall 41*b* of each micro-reaction chamber 41 and having hydrophilic and oleophobic properties. For example, the hydrophilic layer 51 may further cover the region between the micro-reaction chambers 41. Since the surfaces (i.e., the side wall 41*a* and the bottom wall 41*b*) of the micro-reaction chambers 41 are provided with the hydrophilic layer 51, the hydrophilicity of the micro-reaction chambers 41 is improved, and the reaction system solution can automatically and gradually enter each micro-reaction chamber 41 based on a capillary phenomenon without applying a driving force to the reaction system solution by the outside, thereby achieving automatic sample introduction and sample filling.

For example, the material of the hydrophilic layer 51 is silicon oxide or silicon oxynitride subjected to surface alkali treatment, and the surface alkali treatment refers to soaking portions of the silicon oxide or silicon oxynitride covering the side wall 41*a* and the bottom wall 41*b* of the micro-reaction chamber 41 with an alkali solution to perform surface modification and thus form the hydrophilic layer 51.

With continued reference to FIG. 1, the micro-fluidic chip further includes a bonding layer 60, a sample inlet 21, and a sample outlet 22. The bonding layer 60 is located between the base substrate 10 and the cover plate 20, for example, at the edge of the micro-fluidic chip. The material of the bonding layer 60 is thermosetting adhesive or photosensitive adhesive containing spacers. The bonding layer 60, the cover plate 20 and the micro-cavity defining layer 40 enclose an accommodating cavity in which the micro-reaction chamber 41 is located. The accommodating cavity is a cavity in the micro-fluidic chip. During the use of the micro-fluidic chip, the accommodating cavity is filled with a continuous phase (such as mineral oil), and the reaction system solution enters each micro-reaction chamber 41 as a dispersed phase.

The sample inlet 21 and the sample outlet 22 both penetrate through the cover plate 20 and are both communicated with the accommodating cavity. The sample inlet 21 and the sample outlet 22 may be located on two opposite sides of the plurality of micro-reaction chambers 41. The reaction system solution may be injected into the sample inlet 21 by a micro-syringe pump or by a pipette tip, and then enters each micro-reaction chamber 41 by self-priming. The reaction system solution that does not enter the micro-reaction chamber 41 is discharged out of the micro-fluidic chip through the sample outlet 22.

In addition, in some examples, the micro-cavity defining layer 40 may further define a sample inlet channel and a sample outlet channel (not shown), and both the sample inlet channel and the sample outlet channel are communicated with the accommodating cavity. For example, the sample inlet channel is further communicated with the sample inlet 21, so that the liquid can flow into the accommodating cavity from the sample inlet 21 through the sample inlet channel. The sample outlet channel is further communicated with the sample outlet 22, so that the liquid can flow out of the chip from the accommodating cavity through the sample outlet channel and the sample outlet 22. For example, the sample inlet channel and the sample outlet channel may be in any shape such as a straight line shape, a polygonal line shape, or a curved shape, which may be determined according to actual needs, and not limited in the embodiments of the present disclosure. It should be noted that, in other examples, the sample inlet 21 and the sample outlet 22 may be directly disposed on the boundary of the accommodating cavity without a sample inlet channel and a sample outlet channel.

With continued reference to FIG. 1, the micro-fluidic chip may further include a hydrophobic layer 52 disposed on a surface of the cover plate 20 facing the base substrate 10. The hydrophobic layer 52 has hydrophobic and oleophilic properties, and by providing the hydrophobic layer 52, the reaction system solution can more easily enter each of the micro-reaction chambers 41. For example, the material of the hydrophobic layer 52 is silicon nitride subjected to plasma modification treatment. It should be noted that the embodiments of the present disclosure are not limited thereto, and the hydrophobic layer 52 may also be made of resin or other suitable inorganic or organic material, as long as the side of the hydrophobic layer 52 facing the micro-cavity defining layer 40 has hydrophobicity. For example, the hydrophobic layer 52 may be made directly of a hydrophobic material. For another example, the hydrophobic layer 52 may be made of a material that does not have hydrophobicity, and in this case, the surface of the hydrophobic layer 52 facing the micro-cavity defining layer 40 needs to be subjected to a hydrophobic treatment so as to make the hydrophobic layer 52 have hydrophobicity.

In the embodiment of the present disclosure, the hydrophilic layer 51 and the hydrophobic layer 52 may jointly adjust the surface contact angle of the liquid drop of the reaction system solution, so that the micro-fluidic chip realizes self-liquid-absorption sample introduction and oil sealing. For example, in the micro-fluidic chip, the hydrophobic layer 52 improves the hydrophobic property of the outside of the micro-reaction chamber 41, and the hydrophilicity of the inner surface of the micro-reaction chamber 41 is good, so that the reaction system solution is infiltrated from the outside of the micro-reaction chamber 41 to the inside of the micro-reaction chamber 41. Therefore, the reaction system solution more easily enters each of the micro-reaction chambers 41 by the combined action of the hydrophilic layer 51 and the hydrophobic layer 52.

It should be noted that the sample inlet 21 and the sample outlet 22 both penetrate the hydrophobic layer 52.

In the micro-fluidic chip shown in FIG. 1, the cover plate 20 serves as a heat dissipation plate having a first surface S1 facing the heating layer 30 and a second surface S2 away from the heating layer 30, and the second surface S2 serves as a heat dissipation surface having an area larger than an area of an orthographic projection of the cover plate 20 on a plane where the heating layer 30 is located, thereby improving the heat dissipation effect.

In some embodiments, the second surface S2 is provided with a plurality of grooves Va, so that the second surface S2 has a large area, thereby improving the heat dissipation effect. In addition, as compared to a case where the second surface is planer, heat is exchanged more easily when the heat dissipation fluid is in contact with the uneven surface, thereby further improving heat dissipation effect. It should be understood that when the second surface S2 has the grooves Va, the area of the second surface S2 is the sum of the area of the inner wall of each groove Va and the area of portions of the second surface S2 where the grooves Va are not formed.

The orthographic projection of the plurality of micro-reaction chambers 41 on the base substrate 10 overlaps with the orthographic projection of at least two grooves Va on the base substrate 10, so as to facilitate the effective heat dissipation of the micro-reaction chambers 41 by the grooves Va. For example, the orthographic projection of a region where the micro-reaction chambers 41 are located on the base substrate 10 is within the orthographic projection of a region where the grooves Va are located on the base substrate 10, so as to facilitate sufficient heat dissipation of the micro-reaction chambers 41 by the grooves Va. For example, the orthographic projection of the region where the plurality of grooves Va are located on the base substrate 10 may be the same as the orthographic projection of the region where the plurality of micro-reaction chambers 41 are located on the base substrate 10, or slightly larger than the orthographic projection of the region where the plurality of micro-reaction chambers 41 are located on the base substrate 10.

It should be noted that the region where the plurality of grooves Va are located is a continuous region, which may be regarded as a minimum region capable of covering all the grooves Va. Similarly, the region where the plurality of grooves Va are located is also a continuous region, which may be regarded as a minimum region capable of covering all the grooves Va.

Figure 6:
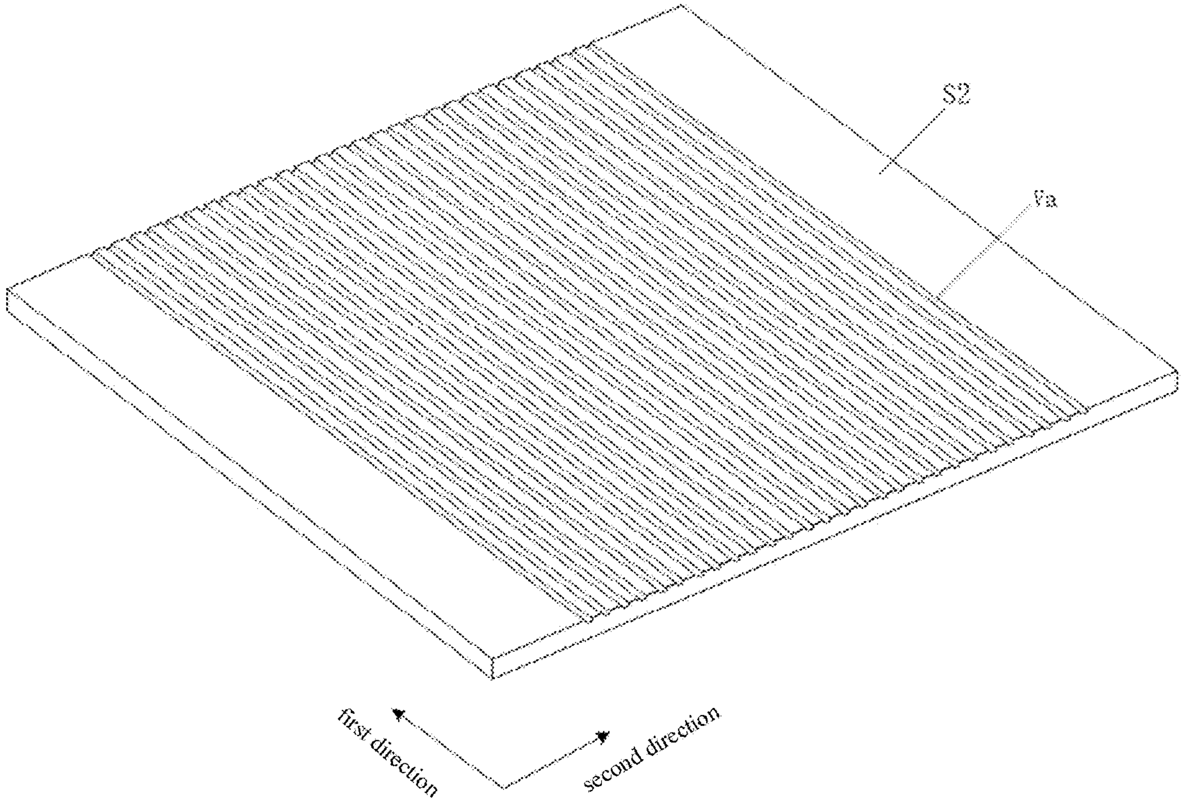
FIG. 6 is a perspective view illustrating groove distribution on a second surface according to some embodiments of the present disclosure.
Figure 7:
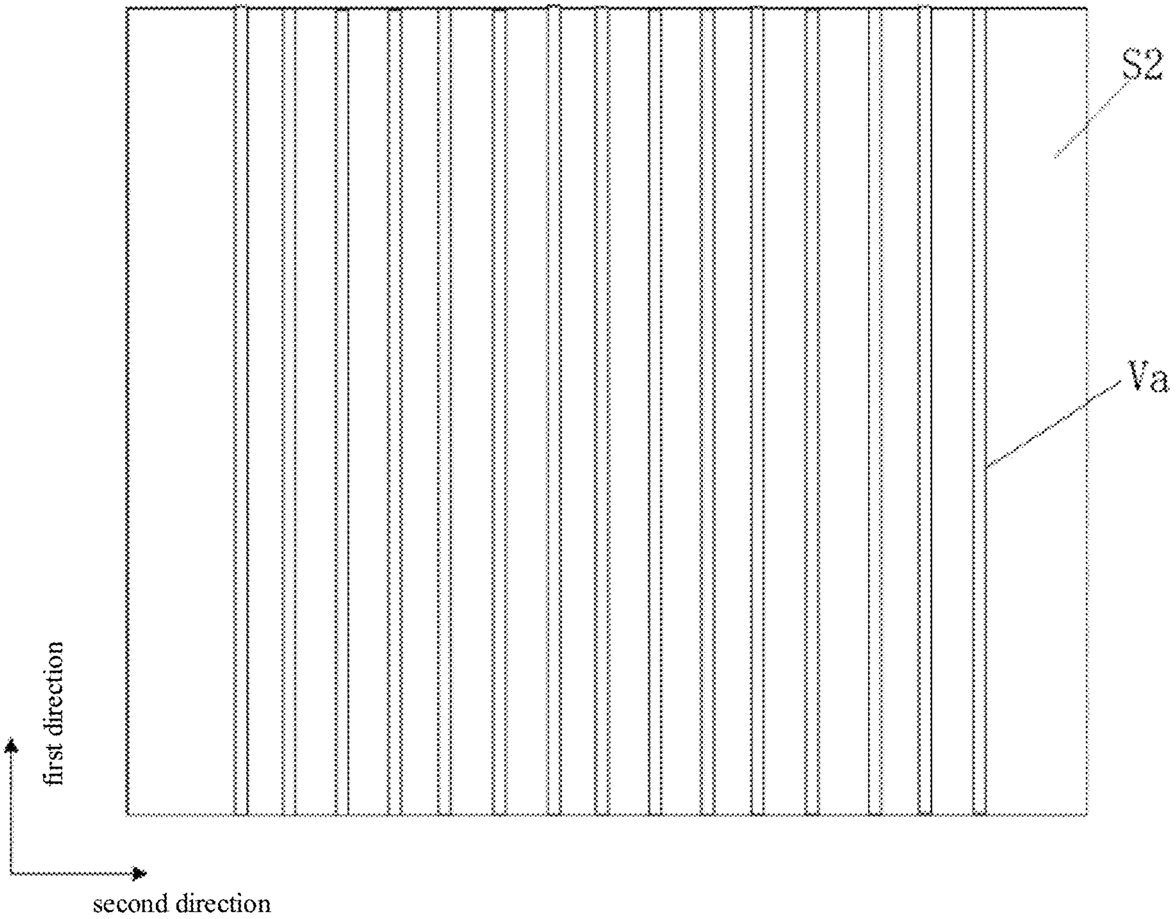
FIG. 7 is a plan view illustrating groove distribution on the second surface according to some embodiments of the present disclosure.

FIG. 6 is a perspective view illustrating the distribution of grooves on the second surface according to some embodiments of the present disclosure, and FIG. 7 is a plan view illustrating the distribution of grooves on the second surface according to some embodiments of the present disclosure. As shown in FIGS. 6 and 7, each of the plurality of grooves Va extends along a first direction, and the plurality of grooves Va are arranged at intervals along a second direction, and the first direction intersects the second direction, for example, the first direction and the second direction are perpendicular to each other.

The groove Va extending in the first direction means that an orthographic projection of the groove Va on the first surface tends to extend substantially in the first direction. The shape of the groove Va is not particularly limited in the present disclosure, for example, the cross section of the groove Va perpendicular to the fifth direction is rectangular, or approximately trapezoidal, or arc; the orthographic projection of the groove Va on the first surface S1 is rectangular or approximately rectangular.

Exemplarily, in FIGS. 6 and 7, the plurality of grooves Va may have the same length, the same width, and the same depth. In FIGS. 6 and 7, the length of the groove Va refers to the dimension of the groove Va in the first direction, and the width of the groove Va refers to the dimension of the groove Va in the second direction. Exemplarily, the length of each groove Va may be between 0.2 mm and 0.4 mm, for example, the width of each groove Va may be 0.2 mm, 0.3 mm or 0.4 mm. Exemplarily, each groove Va has a depth between 0.1 mm and 0.3 mm, for example, each groove Va has a depth of 0.1 mm, 0.2 mm or 0.3 mm. Each of the grooves Va may extend throughout the second surface in the first direction, i.e., the length of the groove Va may be equal to the dimension of the second surface in the first direction.

As shown in FIGS. 6 and 7, in some embodiments, the plurality of grooves Va are uniformly distributed, that is, the interval between every two adjacent grooves Va is equal. Exemplarily, the interval between every two adjacent grooves Va is between 0.8 mm and 1.2 mm, for example, the interval between every two adjacent grooves Va is 0.8 mm, 0.9 mm, 1 mm, 1.1 mm or 1.2 mm. Here, the interval between two adjacent grooves Va means the closest distance between the two adjacent grooves Va.

Figure 8:
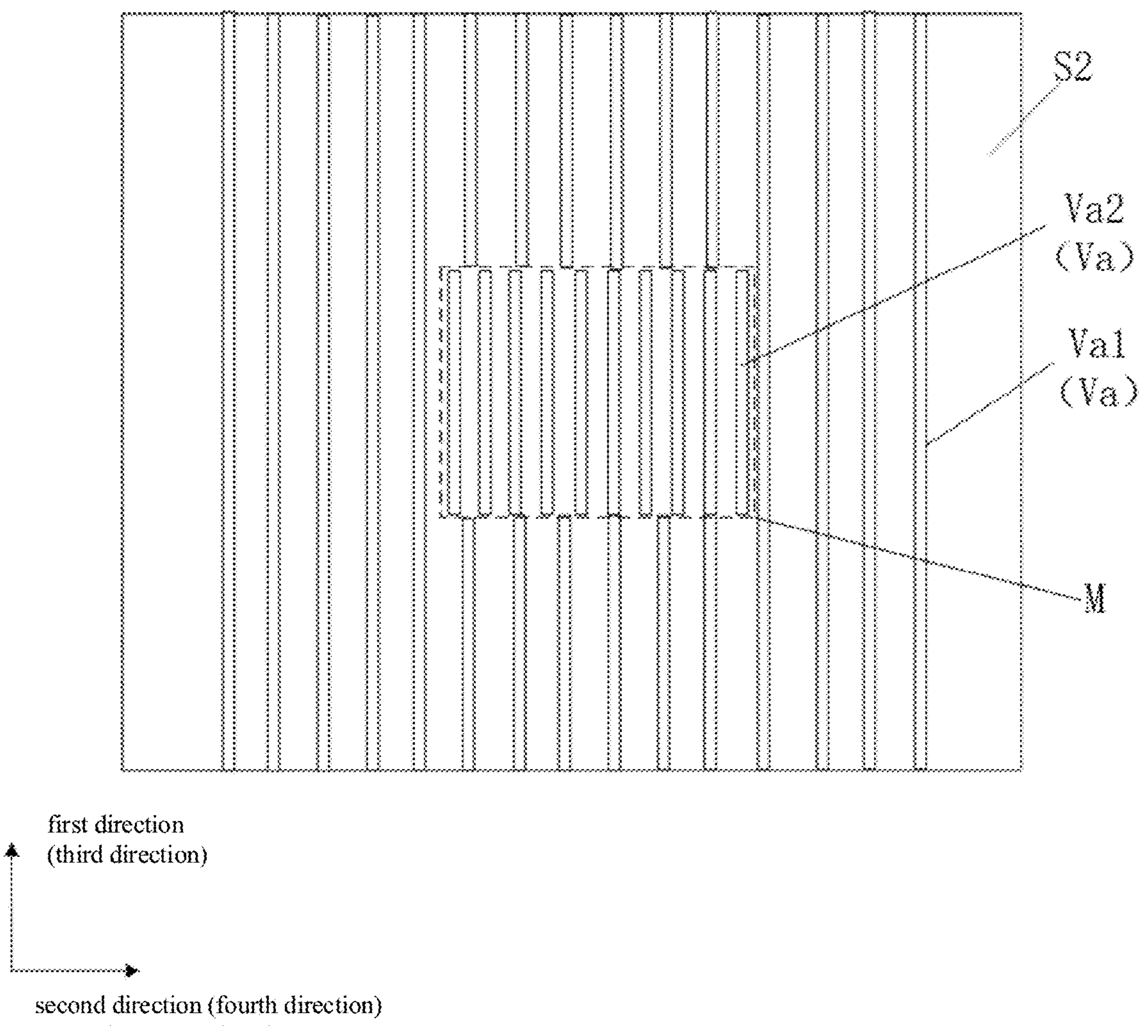
FIG. 8 is a plan view illustrating groove distribution on the second surface according to some other embodiments of the present disclosure.

FIG. 8 is a plan view illustrating the groove distribution on the second surface according to other embodiments of the present disclosure. As shown in FIG. 8, the plurality of grooves Va are unevenly distributed, and specifically, the plurality of grooves Va includes a plurality of first grooves Va1 and a plurality of second grooves Va2, and the plurality of first grooves Va1 are located in a region M shown by a dashed box in FIG. 8, which corresponds to the middle region of the micro-cavity defining layer 40, i.e., an orthographic projection of the plurality of first grooves Va1 on the micro-cavity defining layer 40 is located in the middle region of the micro-cavity defining layer 40. An orthographic projection of the plurality of second grooves Va2 on the micro-cavity defining layer 40 surrounds the middle region. The distribution density of the plurality of first grooves Va1 is greater than the distribution density of the plurality of second grooves Va2.

It can be understood that when the cooling fluid impacts on a flat surface, the heat dissipation effect of the middle region of the surface is weaker than that of the edge region of the surface. In the embodiment shown in FIG. 8, however, the plurality of first grooves Va1 are surrounded by the plurality of second grooves Va2, and the distribution density of the first grooves Va1 is greater than that of the second grooves Va2, so as to improve the heat dissipation effect of the region where the first grooves Va1 are located, and further, the cooling effect of each position of the micro-cavity defining layer 40 tends to be uniform.

The shapes of first groove Va1 and second groove Va2 are not particularly limited in the embodiments of the present disclosure, and for example, as shown in FIG. 8, each of the plurality of first grooves Va1 extends in a first direction, and the plurality of first grooves Va1 are arranged at intervals in a second direction, the first direction intersecting the second direction, for example, the first direction being perpendicular to the second direction. It should be noted that, the first groove Va1 extending along the first direction means that the first groove Va1 tends to extend substantially along the first direction and the maximum dimension thereof in the first direction is larger than the maximum dimension thereof in the second direction, but does not mean that the first groove Va1 is necessarily linear. For example, the orthographic projection of the first groove Va1 on the first surface may be rectangular, or trapezoidal, or may be an irregular pattern such as arc or wave. In addition, the cross section of the first groove Va1 perpendicular to the first direction may be rectangular, or approximately trapezoidal, or arc, which is not limited in the present disclosure.

Each side of the region where the plurality of first grooves Va1 are located is provided with a plurality of second grooves Va2, each second groove Va2 extends along a third direction, and the plurality of second grooves Va2 located on the same side are arranged at intervals along a fourth direction, and the third direction intersects the fourth direction. For example, the third direction is perpendicular to the fourth direction. It should be noted that, the second groove Va2 extending along the third direction means that the second groove Va2 tends to extend substantially along the third direction, and the maximum size of the second groove Va2 in the third direction is larger than the maximum size of the second groove Va2 in the fourth direction, but does not mean that the second groove Va2 is necessarily linear. For example, the orthographic projection of the second groove Va2 on the first surface may be rectangular, or trapezoidal, or may be an irregular pattern such as arc or wave. In addition, the cross section of the second groove Va2 perpendicular to the third direction may be rectangular, or approximately trapezoidal, or arc, which is not limited in the present disclosure.

In one example, as shown in FIG. 8, the extending direction of the first grooves Va1 is the same as the extending direction of the second grooves Va2, and the arrangement direction of the plurality of first grooves Va1 is the same as the arrangement direction of the plurality of second grooves Va2, that is, the third direction is the same as the first direction, and the second direction is the same as the fourth direction. It should be noted that the embodiments of the present disclosure are not limited thereto, and for example, the extending direction of the first groove Va1 and the extending direction of the second groove Va2 may also intersect.

In some embodiments, the width of the first groove Va1 is substantially equal to the width of the second groove Va2. It should be noted that the width of the first groove Va1/second groove Va2 refers to the dimension of the first groove Va1/second groove Va2 in the direction perpendicular to the extending direction thereof, and for the case shown in FIG. 8, the first groove Va1 extends in the first direction and thus the width of the first groove Va1 is the dimension of first groove Va1 in the second direction, and the second groove Va2 extends in the third direction and thus the width of the second groove Va2 is the dimension of second groove Va2 in the fourth direction.

Exemplarily, the width of the first groove Va1 and the width of the second groove Va2 are both between 0.2 mm and 0.4 mm. For example, the width of the first groove Va1 and the width of the second groove Va2 are both 0.2 mm, 0.3 mm or 0.4 mm. It should be noted that, the widths of the first and second grooves Va1 and Va2 may differ from each other.

In some embodiments, the depth of the first groove Va1 is substantially equal to the depth of the second groove Va2 to facilitate the manufacturing process. Exemplarily, the depth of the first groove Va1 and the depth of the second groove Va2 are both between 0.1 mm and 0.3 mm. For example, the depth of the first groove Va1 and the depth of the second groove Va2 are both 0.1 mm, 0.2 mm or 0.3 mm.

In some embodiments, the interval between adjacent first grooves Va1 is less than the interval between adjacent second grooves Va2. For example, the interval between adjacent first grooves Va1 is 0.4 to 0.9 times the interval between adjacent second grooves Va2. For example, the interval between adjacent first grooves Va1 is 0.4, 0.5, 0.6, 0.7, 0.8, or 0.9 times the interval between adjacent second grooves Va2.

Exemplarily, the interval between adjacent first grooves Va1 is between 0.4 mm and 0.6 mm. For example, the interval between adjacent first grooves Va1 is 0.4 mm, 0.5 mm or 0.6 mm. The interval between adjacent second grooves Va2 is between 0.8 mm and 1.2 mm. For example, the interval between adjacent second grooves Va2 is 0.8 mm, 0.9 mm, 1.0 mm, 1.1 mm or 1.2 mm.

It should be noted that, in the embodiment shown in FIG. 8, the case where the orthographic projections of the first groove Va1 and the second groove Va2 on the first surface S1 are both rectangular is taken as an example, and in practical applications, the first groove Va1 and the second groove Va2 may be set to have other shapes as needed. For example, the first groove Va1 is cylindrical, truncated cone, etc., each second groove Va2 surrounds multiple first grooves Va1, and multiple second grooves Va2 are nested in sequence.

It should be further noted that, in the micro-fluidic chip, various arrangements of the heating layer 30 and various arrangements of the grooves Va may be combined with each other, for example, when the plurality of grooves Va are arranged as shown in FIG. 7, the heating layer 30 may be arranged as shown in any one of FIGS. 3 to 5; when the plurality of grooves Va are arranged as shown in FIG. 8, the heating layer 30 may be arranged as shown in any one of FIGS. 3 to 5.

In addition, it should be noted that the above embodiment has been described by taking an example in which the heating layer 30 is provided on the base substrate 10 and the groove Va is provided on the cover plate 20. In other embodiments, the positions of the heating layer 30 and the groove Va may be adjusted. For example, in the embodiment shown in FIG. 2A, the heating layer 30 is disposed on the cover plate 20, and the groove Va is disposed on the base substrate 10.

The micro-fluidic chip shown in FIG. 2A is similar to the micro-fluidic chip shown in FIG. 1, except that in FIG. 2A, the heating layer 30 is disposed on the surface of the cover plate 20 facing the base substrate 10, and the surface of the base substrate 10 away from the cover plate 20 has a plurality of grooves Va. In this case, no insulation layer may be provided between the base substrate 10 and the micro-cavity defining layer 40, and in addition, the heating layer 30 is located between the hydrophobic layer 52 and the cover plate 20.

It should be noted that although the positions of the heating layer 30 and the groove Va in FIG. 2A are different from those in FIG. 1, the specific structures of the heating layer 30 and the groove Va may be provided by referring to the structures described in the above embodiments, and are not described again here.

It should be further noted that, in the micro-fluidic chip shown in FIGS. 1 and 2A, the base substrate 10 and the micro-cavity defining layer 40 are made of different materials, while in other embodiments, the base substrate 10 and the micro-cavity defining layer 40 may be made of the same material.

The micro-fluidic chip shown in FIG. 2B is similar to the micro-fluidic chip shown in FIG. 2A, except that in FIG. 2B, the base substrate 10 and the micro-cavity defining layer 40 are made of the same material, for example, both are made of an organic material, or both are made of an inorganic material. In this case, the base substrate 10 and the micro-cavity defining layer 40 are formed as a single piece, which is more advantageous for heat dissipation of the micro-reaction chamber 41.

The present disclosure further provides a reaction system including the micro-fluidic chip according to any of the embodiments of the present disclosure. The reaction system can improve the heating efficiency and the heat dissipation efficiency of a plurality of micro-reaction chambers, thereby improving the detection efficiency. Moreover, at least some embodiments can also improve the uniformity of heating and cooling of multiple micro-reaction chambers.

Figure 9:
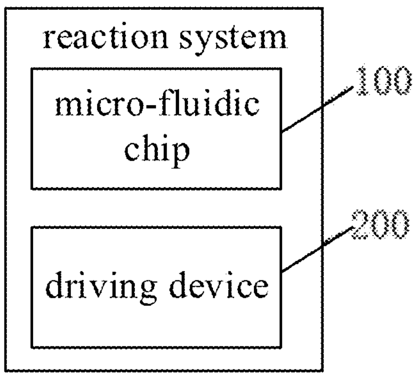
FIG. 9 is a schematic block diagram of a reaction system according to some embodiments of the present disclosure.

FIG. 9 is a schematic block diagram of a reaction system according to some embodiments of the present disclosure. As shown in FIG. 9, the reaction system includes a driving device 200 and a micro-fluidic chip 100, and the driving device 200 is electrically coupled to the micro-fluidic chip 100 to provide an electrical signal to the micro-fluidic chip 100. For example, the driving device 200 applies an electrical signal to the micro-fluidic chip 100, so that the heating layer releases heat, thereby controlling the temperature in the micro-reaction chamber, and allowing the reaction system solution contained in the micro-reaction chamber to perform an amplification reaction at a suitable temperature.

The driving device 200 may be implemented by general-purpose or special-purpose hardware, software, or firmware, for example, and may include a central processing unit (CPU), an embedded processor, a programmable logic controller (PLC), and the like, which is not limited in the embodiments of the present disclosure.

It should be noted that, in the embodiments of the present disclosure, the reaction system may further include more components, for example, a temperature sensor, an optical unit, a temperature cooling unit, a communication unit, a power supply, and the like, which is not limited in the embodiments of the present disclosure.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and essence of the present disclosure, and these changes and modifications are to be considered within the protection scope of the present disclosure.

What is claimed is:

1. A micro-fluidic chip, comprising:

a base substrate;

a micro-cavity defining layer on the base substrate and defining a plurality of micro-reaction chambers;

a cover plate on a side of the micro-cavity defining layer away from the base substrate;

a heating layer between the micro-cavity defining layer and one of the base substrate and the cover plate, and configured to heat the plurality of micro-reaction chambers, wherein one of the base substrate and the cover plate away from the heating layer serves as a heat dissipation plate having a first surface facing the heating layer and a second surface away from the heating layer, and an area of the second surface is larger than an area of an orthographic projection of the heating plate on a plane where the heating layer is located;

wherein the second surface is provided with a plurality of grooves, and an orthogonal projection of the plurality of micro-reaction chambers on the base substrate overlaps an orthogonal projection of at least two of the plurality of grooves on the base substrate;

wherein the plurality of grooves comprises a plurality of first grooves and a plurality of second grooves, an orthographic projection of the plurality of first grooves on the micro-cavity defining layer is in a middle region of the micro-cavity defining layer, the plurality of second grooves surround a region where the plurality of first grooves are located, and a distribution density of the plurality of first grooves is larger than that of the plurality of second grooves.

2. The micro-fluidic chip according to claim 1, wherein each of the plurality of grooves extends along a first direction, and the plurality of grooves are arranged at intervals along a second direction.

3. The micro-fluidic chip according to claim 2, wherein a dimension of each of the grooves in the second direction is between 0.2 mm and 0.4 mm, a depth of each of the grooves is between 0.1 mm to 0.3 mm, and an interval between every two adjacent ones of the plurality of grooves is between 0.8 mm and 1.2 mm.

4. The micro-fluidic chip according to claim 1, wherein each of the plurality of first grooves extends along a first direction, the plurality of first grooves are arranged at intervals along a second direction, and the first direction intersects the second direction, and each of the plurality of second grooves extends along a third direction, each side of the region where the plurality of first grooves are located is provided with ones of the plurality of second grooves, the second grooves located on a same side of the region where the plurality of first grooves are located are arranged at intervals along a fourth direction, and the third direction intersects the fourth direction.

5. The micro-fluidic chip according to claim 4, wherein a dimension of each of the first grooves in the second direction is substantially equal to a dimension of each of the second grooves in the fourth direction, a depth of each of the first grooves is approximately equal to that of each of the second grooves, and an interval between adjacent ones of the plurality of first grooves is smaller than an interval between adjacent ones of the plurality of second grooves.

6. The micro-fluidic chip according to claim 5, wherein the interval between the adjacent ones of the plurality of first grooves is 0.4 to 0.9 times the interval between the adjacent ones of the plurality of second grooves.

7. The micro-fluidic chip according to claim 1, wherein the micro-fluidic chip further comprises a bonding layer between the cover plate and the base substrate and enclosing an accommodating cavity with the cover plate and the micro-cavity defining layer, the plurality of micro-reaction chambers being in the accommodating cavity.

8. The micro-fluidic chip according to claim 1, wherein the micro-fluidic chip further comprises a hydrophilic layer covering at least a side wall and a bottom wall of each of the plurality of micro-reaction chambers.

9. The micro-fluidic chip according to claim 1, wherein the micro-fluidic chip further comprises a hydrophobic layer, wherein the heating layer is on a side of the base substrate facing the cover plate, and the hydrophobic layer is on a side of the cover plate facing the base substrate; or the heating layer is on a side of the cover plate facing the base substrate, and the hydrophobic layer is on a side surface of the heating layer facing the micro-cavity defining layer.

10. A micro-fluidic chip, comprising:

a base substrate;

a micro-cavity defining layer on the base substrate and defining a plurality of micro-reaction chambers;

a cover plate on a side of the micro-cavity defining layer away from the base substrate;

a heating layer between the micro-cavity defining layer and one of the base substrate and the cover plate, and configured to heat the plurality of micro-reaction chambers, wherein one of the base substrate and the cover plate away from the heating layer serves as a heat dissipation plate having a first surface facing the heating layer and a second surface away from the heating layer, and an area of the second surface is larger than an area of an orthographic projection of the heating plate on a plane where the heating layer is located;

wherein the heating layer comprises a plurality of heating electrodes connected in series, and an orthographic projection of the plurality of micro-reaction chambers on the base substrate overlaps an orthographic projection of at least two of the plurality of heating electrodes on the base substrate;

wherein each of the plurality of heating electrodes extends along a fifth direction, the plurality of heating electrodes are arranged at intervals in a sixth direction, and the fifth direction intersects the sixth direction;

wherein the plurality of heating electrodes comprises a plurality of first heating electrodes and a plurality of second heating electrodes, and ones of the plurality of second heating electrodes are disposed on both sides of the plurality of first heating electrodes in the sixth direction, wherein the plurality of first heating electrodes each comprises a first sub-electrode and a second sub-electrode that are connected, the second sub-electrode is on both sides of the first sub-electrode in the fifth direction, and an orthographic projection of the first sub-electrode on the second surface is in a middle region of the second surface, and a resistance of the first sub-electrode per unit length is smaller than a resistance of the second sub-electrode per unit length.

11. The micro-fluidic chip according to claim 10, wherein dimensions of the plurality of heating electrodes in the sixth direction are substantially equal, and an interval between every two adjacent ones of the plurality of heating electrodes is substantially equal.

12. The micro-fluidic chip according to claim 10, wherein an area of a cross section of each of the first sub-electrodes perpendicular to the fifth direction is larger than an area of a cross section of each of the second sub-electrodes perpendicular to the fifth direction.

13. The micro-fluidic chip according to claim 10, wherein a dimension of each of the first sub-electrodes in the sixth direction is larger than a dimension of each of the second sub-electrodes in the sixth direction.

14. The micro-fluidic chip according to claim 10, wherein a dimension of each of the first sub-electrodes in the fifth direction is ¼ to ½ of a dimension of each of the first heating electrodes in the fifth direction.

15. The micro-fluidic chip according to claim 10, wherein an orthographic projection of the second sub-electrode on the second surface surround the middle region of the second surface.

16. The micro-fluidic chip according to claim 10, wherein the heating layer further comprises a first driving electrode and a second driving electrode, and the plurality of heating electrodes are connected in series between the first driving electrode and the second driving electrode.

17. The micro-fluidic chip according to claim 10, wherein the micro-fluidic chip further comprises a bonding layer between the cover plate and the base substrate and enclosing an accommodating cavity with the cover plate and the micro-cavity defining layer, the plurality of micro-reaction chambers being in the accommodating cavity.

18. The micro-fluidic chip according to claim 10, wherein the micro-fluidic chip further comprises a hydrophilic layer covering at least a side wall and a bottom wall of each of the plurality of micro-reaction chambers.

19. The micro-fluidic chip according to claim 10, wherein the micro-fluidic chip further comprises a hydrophobic layer, wherein the heating layer is on a side of the base substrate facing the cover plate, and the hydrophobic layer is on a side of the cover plate facing the base substrate; or the heating layer is on a side of the cover plate facing the base substrate, and the hydrophobic layer is on a side of the heating layer facing the micro-cavity defining layer.

* * * * *